United States Patent [19]

Tschang

[11] 4,449,153
[45] May 15, 1984

[54] LIGHT VALVE IMAGING APPARATUS AND METHOD HAVING SUPPLEMENTAL EXPOSURE CONTROL

[75] Inventor: Pin-Seng Tschang, Rochester, N.Y.

[73] Assignee: Eastman Kodak Company, Rochester, N.Y.

[21] Appl. No.: 389,121

[22] Filed: Jun. 16, 1982

[51] Int. Cl.³ .................. H01J 40/14; H04N 1/46; H04N 1/12; G03G 15/01
[52] U.S. Cl. ....................... 358/296; 358/75; 358/302; 346/108; 346/1.1; 250/578; 350/393
[58] Field of Search .................. 346/107 R, 108; 350/353, 354, 355, 356, 357, 360, 392, 393; 358/60, 75, 78, 296, 80; 250/578; 355/4, 32

[56] References Cited

U.S. PATENT DOCUMENTS

| | | |
|---|---|---|
| 4,229,095 | 10/1980 | Mir ........................................... 355/4 |
| 4,312,004 | 1/1982 | Samer et al. ........................ 346/1.1 |
| 4,371,892 | 2/1983 | Mir ......................................... 358/75 |
| 4,377,753 | 3/1983 | Mir ...................................... 250/578 |
| 4,378,568 | 3/1983 | Mir ......................................... 358/75 |

Primary Examiner—George H. Miller, Jr.
Assistant Examiner—Gerald E. Preston
Attorney, Agent, or Firm—Raymond L. Owens

[57] ABSTRACT

In electronic imaging of the kind wherein light is directed uniformly onto a linear light valve array, which includes pixel portions selectively activated to block or transmit the light during successive line address periods, improved gray scale imaging is provided by modulating, during each line address period, the intensity of the light which passes to the light valve array.

8 Claims, 11 Drawing Figures

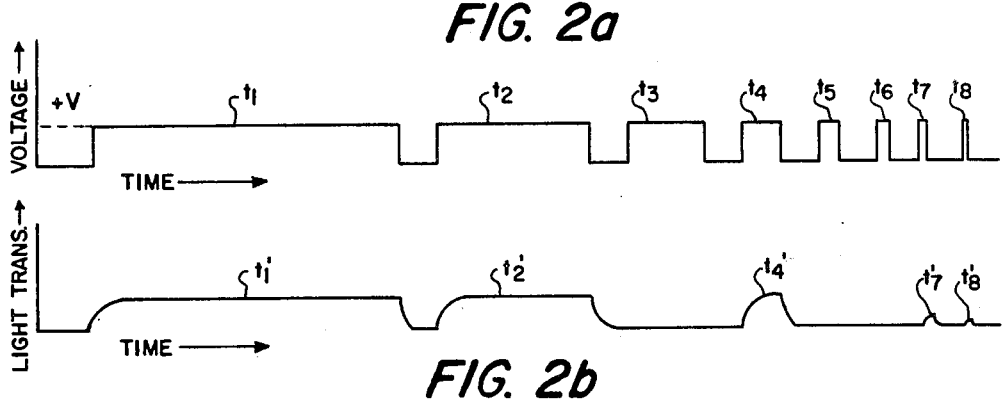
FIG. 2a
FIG. 2b
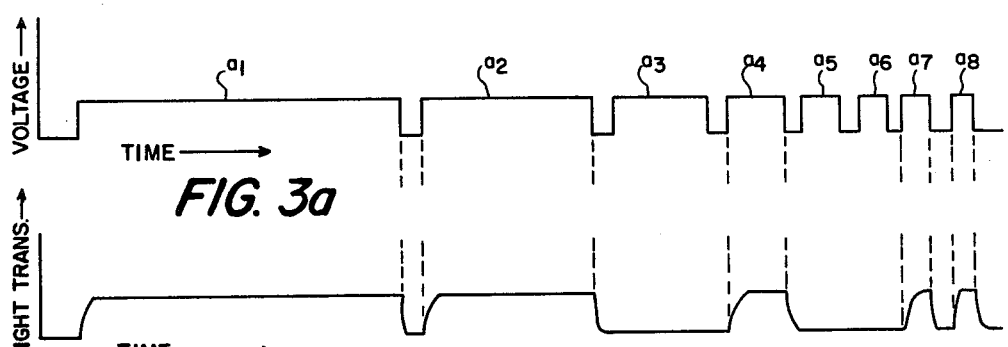
FIG. 3a
FIG. 3b
FIG. 3c
FIG. 3d

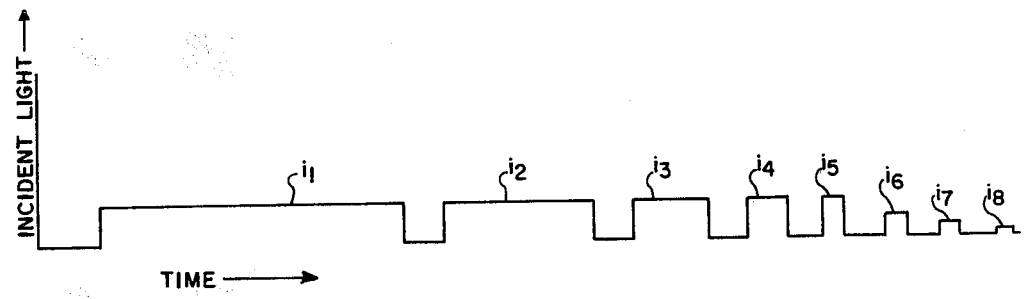
FIG. 4
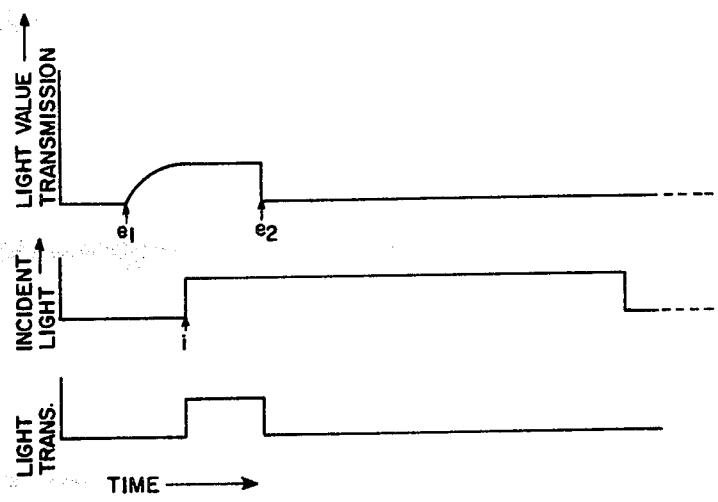
FIG. 5a
FIG. 5b
FIG. 5c

LIGHT VALVE IMAGING APPARATUS AND METHOD HAVING SUPPLEMENTAL EXPOSURE CONTROL

BACKGROUND OF THE INVENTION

1. Field of the Invention

The present invention relates to apparatus and method for forming an image on a recording medium from an electrical signal and more particularly to improvements in electronic imaging apparatus and method of the kind using an array of individually addressable light valves.

2. Brief Description of the Prior Art

U.S. Pat. No. 4,229,095, entitled "Electro-Optical Color Imaging Apparatus" and issued Oct. 21, 1980, discloses various embodiments of electronic color-imaging apparatus that utilize arrays of separately-addressable, pixel (picture element) sized, electro-optical means to effect multicolor exposure of panchromatic imaging media. One preferred kind of electro-optical means disclosed in that patent is a light valve comprising a panel of ferro-electric ceramic material, such as lanthanum doped lead zirconate titanate (PLZT) sandwiched between crossed polarizers and activated to operate in a quadratic Kerr cell mode. An array of such light valves comprises a panel of PLZT material with a plurality of interleaved electrodes formed on one major surface in a manner facilitating the selective application of discrete electrical fields across (in a direction perpendicular to the direction of viewing) discrete surface areas of the plate. Upon application of such fields, the PLZT material becomes birefringent and rotates the direction of polarization of incident light by an extent dependent on the field magnitude. This results in the transmission of light through the PLZT panel and polarizers varying as a function of the electric fields. A color image is formed electronically by selectively opening and closing such light valves in synchronization with the energization of red, green and blue exposing sources and according to the red, green and blue color information for the pixels of that image.

The above-mentioned patent also teaches that, for continuous tone imaging, the electrical energization of the light valves can be varied to provide different exposure levels and thus image density variations, i.e., a gray scale. Two different modes for varying electrical energization to change exposure (and thus density) of a pixel are described, viz: (1) varying the voltage magnitude applied during a nominal exposure period and (2) varying the periods of voltage application with a nominal voltage magnitude.

U.S. Pat. No. 4,378,568 entitled "Light Valve Imaging Apparatus and Method For Providing Gray Scale," and issued Mar. 29, 1983 in the name of J. M. Mir, discloses light valve imaging wherein pixels of the array are selectively operative for one or more of a plurality of discrete sub-period activations at constant voltage. The selected combination of sub-period activations effects proper total light transmission for the pixel. In one embodiment the sub-period activations are of different duration and binarily related so that the exposure via this mode can be termed "bit-oriented."

While each of the varying electrical energization techniques described above are useful in many applications to provide varying exposure level (i.e. gray scale) imaging, problems are presented in some applications. For example, in the variable energization techniques employing different voltage levels, inter-pixel light valve non-uniformities are experienced. (For further discussion of this phenomenon see U.S. Pat. No. 4,371,892, entitled "Light Valve Imaging With Optimized Addressing Potential(s) To Reduce Inter-Pixel Nonuniformity" and issued Feb. 1, 1983 in the name of J. M. Mir.) Constant magnitude voltage techniques (using the half-wave voltage) minimize non-uniformities, but they present other difficulties. For example, the constant-magnitude/variable-period exposure approaches, when undertaken with relatively low level, integrated-circuit-compatible voltages, present difficulties as to the accuracy of light valve switching speeds.

SUMMARY OF THE INVENTION

A significant purpose of the present invention is to provide improved structural and functional approaches for effecting gray scale imaging with light valve arrays. The present invention differs from prior techniques (that rely solely on control of the light valve's electrical energization to provide exposure control) in that supplemental exposure control is impressed upon the imaging light passing to the light valve array. One important advantage of the present invention is that it reduces the light valve exposure control problems incident to slow switching, but maintains the desirable attributes of constant voltage activations. A more general advantage of the present invention is that it improves light valve imaging quality at energizing voltage levels that are compatible with integrated circuit controls.

The above and other advantages are accomplished in accord with one aspect of the present invention by directing light toward a linear light valve array having discretely addressable pixel portions, electrically addressing the pixel regions to transmit or block light according to the content of image lines to be exposed, thus defining information address periods, and modulating the intensity of light directed toward the light valve array within each information address period.

In another aspect the present invention provides in electronic imaging apparatus of the type including (1) a linear light valve array which comprises a plurality of discrete pixel portions independently activatable between light transmitting, "on," and non-transmitting, "off," conditions by selective application of an electrical field, (2) illuminating means for directing light uniformly toward all the pixel portions of the array and (3) addressing means for independently activating the pixel portions to appropriate "on-off" conditions according to image content of a line to be reproduced (thus defining an information address period), the improvement comprising supplemental exposure control means, located between the illuminating means and the array and operative within each such information address period, for modulating the intensity of light from the illuminating means.

In one preferred embodiment the supplemental exposure control means is synchronized with the addressing means to modulate the light intensity from an "off" to an "on" condition in timed relation after light transmitting activations of the light valve array, so that light transmitting characteristics of activated pixel portions have substantially peaked when they receive light from the illuminating means.

In another preferred embodiment the supplemental exposure control means is synchronized with the addressing means to modulate the light intensity from an "on" to an "off" condition in timed relation prior to, or substantially coincident with, non-transmitting activations of the light valve array.

In another preferred embodiment the addressing means provides a plurality of information address periods during each line exposure period and the supplemental exposure control means provides different magnitude "on" light intensities respectively during at least two of the information address periods.

BRIEF DESCRIPTION OF THE DRAWINGS

The subsequent description of preferred embodiments of the invention refers to the attached drawings wherein:

FIGS. 2a and 2b are diagrams illustrating one prior art light valve pixel exposure procedure;

FIGS. 3a–3d are diagrams useful in describing an exemplary light valve pixel exposure sequence in accord with one embodiment of the present invention;

FIG. 4 is a diagram illustrating a variation of the exposure embodiment shown in FIGS. 3a–3d; and FIGS. 5a–5c are diagrams useful in describing an exemplary light valve pixel exposure sequence in accord with another embodiment of the present invention.

DETAILED DESCRIPTION OF PREFERRED EMBODIMENTS

Figure 1:
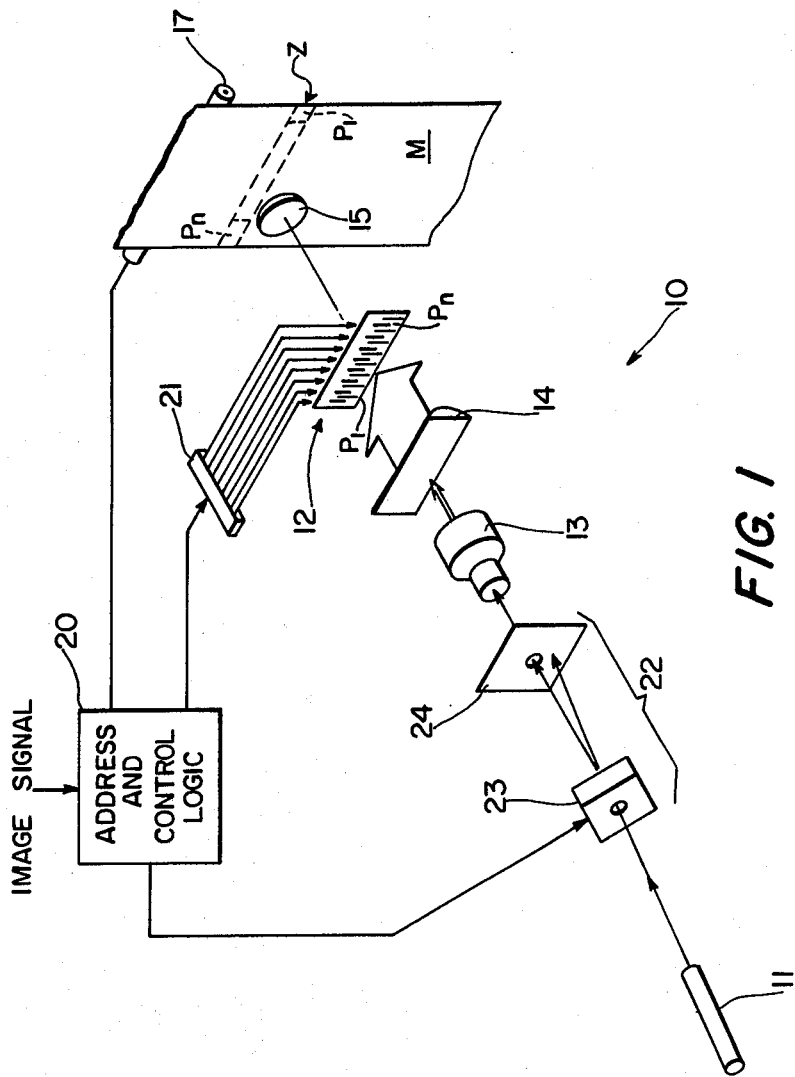
FIG. 1 is a schematic perspective view of one preferred embodiment of the present invention.

FIG. 1 schematically illustrates one preferred embodiment of electronic imaging apparatus 10 in accordance with the present invention. In this embodiment an illumination source 11 directs a beam of light toward light valve array 12. A beam expander 13 and cylindrical lens 14 direct the light to form a sheet beam that uniformly illuminates all pixel portions of the light valve array 12. Lens means 15 images the light valve array on a linear exposure zone wherepast a photosensitive imaging media M is moved by drive means 17.

The preferred light valve array comprises a panel of electro-optic material (e.g. 9/65/35 PLZT) sandwiched between crossed polarizers. Electrodes are provided on the electro-optic panel in a configuration providing a plurality of independent electric activating fields transversely across discrete pixel portions $P_1-P_n$. Address and control logic 20 provides signals to address electrodes of each pixel portion e.g. via a serial-in/parallel-out shift register 21. Further details of the addressing technique and light valve electrode configurations are described in U.S. Pat. No. 4,229,095 and in U.S. Pat. No. 4,378,568, entitled "Light Valve Imaging Apparatus and Method For Providing Gray Scale" and issued Mar. 29, 1983 in the name of J. M. Mir, both of which are incorporated herein by reference. In general, the address and control logic 20 receives signals indicative of the pixel information for successive lines of an image to be reproduced and controls activations of light valve array 12 between light-transmitting ("on") and non-transmitting ("off") conditions. Logic 20 also controls the movement of the image medium M past exposure zone so that light from illuminating means 11 records successive image lines on the medium M.

Above-referenced U.S. Pat. No. 4,378,568 describes details of the "bit oriented" technique by which logic 20 can effect gray scale exposures in light valve imaging apparatus of the kind described above. The general approach of this gray scale system is to provide to each pixel of a given line of recoding medium one or more fixed intensity, varying-duration doses of light during a line exposure period, such doses totalling the prescribed total exposure for the pixel. FIG. 2a illustrates this procedure graphically. Thus, a counter is provided to successively provide information address periods $t_1-t_8$ of different length, preferably binarily related. Light valve pixel portions $P_1-P_n$ are independently activated or not (with the fixed-level voltage +V) for a particular schedule of the information address periods depending on the density level which is desired to be exposed on their associated pixels $P_1'-P_n'$ of a line of the recording medium M. For example, an exposure scheduled for one pixel might require components, $t_1$, $t_2$, $t_4$, $t_7$ and $t_8$, and the light valve pixel portion corresponding to that pixel would be energized and de-energized according to those periods as shown in FIG. 2a.

FIG. 2b shows the light transmission through a light valve pixel portion for the exemplary schedule of information address period activations $t_1$, $t_2$, $t_4$, $t_7$ and $t_8$. It will be noted that the total exposure (total area under curve portions $t_1'$, $t_2'$, $t_4'$, $t_7'$ and $t_8'$) of FIG. 2b does not correspond exactly to an activating signal which directed constant level energization (and thus constant level transmission) precisely for the selected information address periods $t_1$, $t_2$, $t_4$, $t_7$ and $t_8$. Comparing the shape of the corresponding portions of curves 2a and 2b, it will be noted that there is a delay, after energization commences (i.e., the beginning of the information address period), before transmission reaches the desired level and another shorter delay after de-energization (i.e., the end of the information address period) before transmission ceases. At the shorter information address periods ($t_7$, $t_8$), the desired level of transmission is never attained. The exposure error incident to these inaccuracies in curve correspondence (of FIG. 2b portions of curves with FIG. 2a portions) can result in loss of monotonicity and cause picture contouring.

In accordance with one aspect of the present invention, supplemental exposure control is provided to reduce the above-described exposure errors. Exposure control means 22 shown in FIG. 1 provides one mode of effecting such supplemental control. The general function of supplemental exposure control means 22 is to modulate the passage of light onto the array 12 and thus to exposure zone Z. In the FIG. 1 embodiment supplemental exposure control means 22 comprises an acousto-optic cell 23 and an apertured mask 24. Under the control of address and control logic 20, an electromechanical transducer generates an acoustic wave through the cell 23 to deflect a first order diffracted light beam into alignment with the aperture in mask 24. The intensity of the diffracted first order beam can be controlled by varying the amplitude of the transducer energization. Thus the modulator 21 can turn the light beam "on-off" with respect to the array 12 as well as control the intensity of light in the "on" condition between different selected intensity levels.

One preferred mode of operation in accordance with the present invention can now be described with respect to FIGS. 1 and 3a–3d. In this embodiment address and control logic 20 controls illumination of the light valve array 12, via supplemental exposure control means 22, to provide a series of constant-intensity illumination pulses $i_1-i_8$, which vary in duration as shown in FIG. 3c. In predetermined synchronization with these illumination pulses logic means 20 provides the light valve pixel portions $P_1-P_n$ with successive (counter-controlled) information address periods $a_1-a_8$ (FIG. 3a), at the beginning and end of which the participating light valves are independently turned "on" and "off." As noted above, whether a particular pixel portion is turned on and then off (or does not participate and remains off) during the information address periods ($t_1$–$t_8$) is controlled by logic 20 via shift register 21 in accordance with the exposure requirements (dictated by the image signal).

Referring to FIG. 3b, an exemplary schedule of information address periods of the array 12 for a total exposure with constituents $i_1$, $i_2$, $i_4$, $i_7$ and $i_8$ is illustrated. It is important to note the relative time sequences of the light valve energization (FIG. 3a) and their resulting light transmission (FIG. 3b) with respect to the corresponding illumination pulses $i_1$–$i_8$ (FIG. 3c). Thus each information address periods $a_1$, $a_2$, $a_4$, $a_7$ and $a_8$ commences before the beginning of a corresponding illumination pulse $i_1$, $i_2$, $i_4$, $i_7$ and $i_8$. Most preferably the illumination pulse's "on" condition is synchronized with respect to light valve energization to begin while light valve energization is at a stage yielding peak light transmission. Further it will be noted that the light pulses $i_1$, $i_2$, $i_4$, $i_7$ and $i_8$ are timed to be prior to, or coincident with, the de-energization of the light valve. The resultant exposure provided by the light valve array 12 and illumination modulation means 22 for this exemplary schedule can be seen in FIG. 3d. If the FIG. 3d curve is compared to the FIG. 2b (prior art) curve, the advantage of the present invention as to improved exposure accuracy is apparent.

FIG. 4 illustrates an illumination sequence which is a variation of that shown in FIG. 3a. Specifically, it will be noted that the length of illumination pulses $i_6$, $i_7$ and $i_8$ have been increased and that the intensity of illumination during these modified pulse periods decreases. The decrease of intensity in proportion to increase in pulse period length facilitates the use of modulators 23 with slower switch times. As noted above, the intensity variation can be effected by change in signal magnitude from control means 20 to the transducer of cell 23. It will be appreciated that the information address periods for energization of array 12 that correspond to illumination sub-periods $i_6$–$i_8$ will be increased accordingly so that the line exposure information address periods defined thereby allow the illumination pulse periods to occur at the times of peak light valve transmission.

FIGS. 5a–5c illustrate another mode in which the FIG. 1 apparatus can function in accordance with the present invention. In this embodiment each pixel portion of the array 12 has a separate counter which controls a constant-magnitude voltage and variable length (but continuous for the given length) period of light transmission. This mode is particularly adapted for light valves which have a slow rise in transmission upon energization but more rapid transmission decay upon deenergization.

As shown in FIGS. 5a–5c, the array energization commences at "e" (FIG. 5a) sufficiently prior to the commencement of the illumination period at "i" (FIG. 5b) to allow the array transmission to reach its peak. Then modulator means 22 switches illumination on for a line period and the individual light valve counters maintain array transmission until the desired pixel exposure is effected. The deenergizations occur at different times (e.g. $e_2$ in FIG. 5a) within the line period in accord with the signals from the different individual counters. An example of the exposure yielded by the light valve energization and supplemental light control technique of FIGS. 5a and 5b is shown in FIG. 5c.

The invention has been described in detail with particular reference to certain preferred embodiments thereof, but it will be understood that variations and modifications can be effected within the spirit and scope of the invention.

What is claimed is:

1. In electronic imaging apparatus of the type including (1) a linear light valve array which comprises a plurality of discrete, pixel portions independently activatable between light transmitting, "on," and non-transmitting, "off," conditions by selective application of an electrical field, (2) illuminating means for directing light uniformly toward all said pixel portions of said array and (3) addressing means for independently activating said pixel portions to appropriate "on-off" conditions according to image content of a line to be reproduced thus defining an information-address period, the improvement comprising supplemental exposure control means, positioned to control light passing between said illuminating means and said array and operative within each such information-address period, for modulating the intensity of light from said illuminating means.

2. The invention defined in claim 1 wherein said supplemental exposure control means is synchronized with said addressing means to modulate said light intensity from an "off" to an "on" condition in timed relation after light transmitting activations of said light valve array, so that light transmitting characteristics of activated pixel portions have substantially peaked when they receive light from said illuminating means.

3. The invention defined in claim 2 wherein said supplemental exposure control means is synchronized with said addressing means to modulate said light intensity from an "on" to an "off" condition in timed relation coincident with or prior to non-transmitting activations of said light valve array.

4. The invention defined in claims 1, 2 or 3 wherein said addressing means provides a plurality of information address periods during each line exposure period and wherein said supplemental exposure control means provides different magnitude "on" light intensities respectively during at least two of said information address periods.

5. In an electronic imaging method comprising directing light uniformly onto a linear light valve array including a plurality of discretely addressable pixel portions and electrically addressing the pixel portions to transmit or block light according to the content of image lines to be reproduced, thus defining an information address period, the improvement comprising modulating the intensity of light directed onto the light valve array within each information address period.

6. The invention defined in claim 5 wherein said modulating step includes switching said light intensity from an "off" to an "on" condition in timed relation after light transmitting address of said light valve array, so that light transmitting characteristics of on-addressed pixel portions have substantially peaked at the time they receive light.

7. The invention defined in claim 6 wherein said modulating step includes switching said light intensity from an "on" to an "off" condition in timed relation prior to, or coincident with, non-transmitting address of said light valve array.

8. The invention defined in claims 5, 6 or 7 wherein said addressing step includes "on-off" addressing said array in plurality of information address periods during each line exposure period and said modulating step includes varying the magnitude of "on" light intensity with respect to at least two of said information address periods.

* * * * *